(12) United States Patent
Lee et al.

(10) Patent No.: US 10,089,006 B2
(45) Date of Patent: Oct. 2, 2018

(54) DISPLAY APPARATUS AND THE METHOD THEREOF

(71) Applicant: SAMSUNG ELECTRONICS CO., LTD., Suwon-si (KR)

(72) Inventors: Myoung-jun Lee, Bucheon-si (KR);
Hyun-kyu Yun, Seoul (KR);
Kwan-young Kim, Suwon-si (KR);
Kun-ho Keum, Suwon-si (KR);
Min-sup Kim, Suwon-si (KR);
Sang-jin Kim, Suwon-si (KR);
Moon-sung Na, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 493 days.

(21) Appl. No.: 14/324,278

(22) Filed: Jul. 7, 2014

(65) Prior Publication Data

US 2015/0046433 A1 Feb. 12, 2015

(30) Foreign Application Priority Data

Aug. 9, 2013 (KR) .................. 10-2013-0094656

(51) Int. Cl.
| | | |
|---|---|---|
| G06F 7/00 | (2006.01) | |
| G06F 3/0488 | (2013.01) | |
| G06F 17/30 | (2006.01) | |
| H04N 5/445 | (2011.01) | |
| H04N 21/422 | (2011.01) | |

(Continued)

(52) U.S. Cl.
CPC .... G06F 3/04883 (2013.01); G06F 17/30696 (2013.01); G06F 17/30705 (2013.01); H04N 5/445 (2013.01); H04N 5/44582 (2013.01); H04N 21/42206 (2013.01); H04N 21/4312 (2013.01); H04N 21/443 (2013.01); H04N 21/47 (2013.01); H04N 21/42224 (2013.01);
(Continued)

(58) Field of Classification Search
CPC ..................... G06F 17/2735; G06F 3/04883
USPC ........................................................ 707/766
See application file for complete search history.

(56) References Cited

U.S. PATENT DOCUMENTS

| | | |
|---|---|---|
| 5,545,857 A | 8/1996 | Lee et al. |
| 7,502,017 B1 | 3/2009 | Ratzlaff et al. |

(Continued)

FOREIGN PATENT DOCUMENTS

| | | |
|---|---|---|
| CN | 1444392 A | 9/2003 |
| CN | 101317149 A | 12/2008 |

(Continued)

OTHER PUBLICATIONS

Communication dated Mar. 1, 2018, issued by the European Patent Office in counterpart European Application No. 14154767.9.
(Continued)

*Primary Examiner* — Eliyah S Harper
(74) *Attorney, Agent, or Firm* — Sughrue Mion, PLLC

(57) ABSTRACT

A display apparatus is disclosed. The display apparatus includes a display, an input unit configured to receive a handwriting trace, in response to a user handwriting being performed at a remote control apparatus; a detector configured to determine text corresponding to the handwriting trace; and a controller configured to search for an item corresponding to the text, classify the item into a plurality of categories, and control the display to display the item on the display.

15 Claims, 17 Drawing Sheets

(51) Int. Cl.
*H04N 21/431* (2011.01)
*H04N 21/443* (2011.01)
*H04N 21/47* (2011.01)
*H04N 5/44* (2011.01)
*H04N 21/462* (2011.01)

(52) U.S. Cl.
CPC . *H04N 21/4622* (2013.01); *H04N 2005/4432* (2013.01)

(56) References Cited

U.S. PATENT DOCUMENTS

| | | | |
|---|---|---|---|
| 7,546,551 | B2 | 6/2009 | Sakata et al. |
| 8,094,941 | B1 | 1/2012 | Rowley et al. |
| 9,003,284 | B2 * | 4/2015 | Ohira ............... G06F 3/018 715/262 |
| 9,479,817 | B2 * | 10/2016 | Kwon ............... G06F 3/04883 |
| 9,788,045 | B2 | 10/2017 | Kwon |
| 2003/0185444 | A1 | 10/2003 | Honda |
| 2005/0198024 | A1 | 9/2005 | Sakata et al. |
| 2005/0264538 | A1 | 12/2005 | Yeh |
| 2005/0283804 | A1 | 12/2005 | Sakata et al. |
| 2006/0024021 | A1 | 2/2006 | Utsuki et al. |
| 2006/0209042 | A1 * | 9/2006 | Cohen ............... G06F 3/002 345/173 |
| 2007/0106497 | A1 * | 5/2007 | Ramsey ............ G06F 17/278 704/9 |
| 2007/0152961 | A1 | 7/2007 | Dunton et al. |
| 2007/0276355 | A1 | 11/2007 | Nielsen et al. |
| 2008/0104020 | A1 | 5/2008 | Kato |
| 2009/0006343 | A1 * | 1/2009 | Platt ............... G06F 17/30389 |
| 2009/0187548 | A1 | 7/2009 | Ji et al. |
| 2010/0153265 | A1 | 1/2010 | Hershfield et al. |
| 2010/0063980 | A1 | 3/2010 | Napper et al. |
| 2010/0169841 | A1 * | 7/2010 | Singh ............... G06F 3/04883 715/863 |
| 2010/0306230 | A1 * | 12/2010 | Son ............... G06Q 10/10 707/769 |
| 2011/0288997 | A1 | 11/2011 | McBride |
| 2011/0302060 | A1 | 12/2011 | Cano |
| 2012/0032901 | A1 | 2/2012 | Kwon |
| 2012/0129859 | A1 * | 5/2012 | Hu ............... A61K 31/4412 514/237.2 |
| 2012/0139859 | A1 | 6/2012 | Ohira et al. |
| 2012/0183273 | A1 | 7/2012 | Utsuki et al. |
| 2012/0268556 | A1 * | 10/2012 | Cho ............... A61B 6/14 348/38 |
| 2013/0268556 | A1 * | 10/2013 | Han ............... G06F 17/30424 707/769 |
| 2014/0015780 | A1 * | 1/2014 | Kim ............... G06F 3/01 345/173 |
| 2014/0204279 | A1 | 7/2014 | Kwon |
| 2014/0245120 | A1 * | 8/2014 | Schwartz ......... G06K 9/00402 715/226 |
| 2017/0134790 | A1 | 5/2017 | Kwon |

FOREIGN PATENT DOCUMENTS

| | | |
|---|---|---|
| CN | 101867741 A | 10/2010 |
| DE | 195 10 657 A1 | 2/1996 |
| EP | 2 290 957 A1 | 3/2011 |
| EP | 2 456 178 A1 | 5/2012 |
| EP | 2 775 389 A2 | 9/2014 |
| JP | 2000-76279 A | 3/2000 |
| JP | 2000-187658 A | 7/2000 |
| JP | 2000-305933 A | 11/2000 |
| JP | 2005-242209 A | 9/2005 |
| JP | 2006-33776 A | 2/2006 |
| JP | 2006-217215 A | 8/2006 |
| JP | 200960328 A | 3/2009 |
| JP | 2010-204987 A | 9/2010 |
| JP | 2011-48786 A | 3/2011 |
| JP | WO2011/024282 A1 | 3/2011 |
| JP | 2012-38292 A | 2/2012 |
| KR | 10-2008-0068488 A | 7/2008 |
| WO | 2007078886 A2 | 7/2007 |

OTHER PUBLICATIONS

Communication dated Apr. 3, 2018, issued by the State Intellectual Property Office of People's Republic of China in counterpart Chinese Application No. 201480043760.9.
Communication dated Apr. 3, 2018, issued by the Japanese Patent Office in counterpart Japanese Application No. 2016-533004.
Office Action dated Feb. 9, 2018, issued by the U.S. Patent and Trademark Office in U.S. Appl. No. 14/453,753.
International Search Report (PCT/ISA/210), dated May 22, 2014, issued by the International Searching Authority in counterpart International Patent Application No. PCT/KR2014/001119.
Written Opinion (PCT/ISA/237), dated May 22, 2014, issued by the International Searching Authority in counterpart International Patent Application No. PCT/KR2014/001119.
USPTO Office Action dated Mar. 10, 2017 issued in co-pending U.S. Appl. No. 14/453,753.
Communication dated Feb. 6, 2017, issued by the European Patent Office in counterpart European application No. 14154767.9.
Communication dated Feb. 7, 2017, issued by the European Patent Office in counterpart European application No. 14180187.8.
Communication, Issued by the European Patent Office, dated Jan. 7, 2015, In counterpart European Application No. 14154767.9.
Communication, Issued by the European Patent Office, dated Jan. 9, 2015, In counterpart European Application No. 14180187.8.
Office Action dated Jul. 27, 2017 issued by the U.S. Patent and Trademark Office in U.S. Appl. No. 14/453,753.
Communication dated Nov. 7, 2017 by the Japanese Patent Office in counterpart Japanese Patent Application No. 2016-533004.

* cited by examiner

DISPLAY APPARATUS AND THE METHOD THEREOF

CROSS-REFERENCE TO RELATED APPLICATION

This application claims priority from Korean Patent Application No. 10-2013-0094656 filed on Aug. 9, 2013 in the Korean Intellectual Property Office, the disclosure of which is incorporated herein by reference in its entirety.

BACKGROUND

1. Technical Field

Apparatuses and methods consistent with exemplary embodiments relate to a display apparatus and a method thereof, and more particularly, to a display apparatus controlled by a user handwriting trace and a display method thereof.

2. Description of the Related Art

With development of technologies, a television (TV) embedded with various functions are now available. Thus, a user may not only view broadcast content through the TV, but may also experience various other content types as well as applications and other known combinations that may work with the Internet, etc. A Smart TV is one of an example providing such various functions.

As the proportion of embedded functionality in the Smart TV has increased, a control apparatus for using the functions has become more complicated. Accordingly, in order to lower a difficulty barrier of using various functions due to the complicated apparatus, the control apparatus and a relevant user interface (UI) needs to be simplified. Accordingly, a design of a remote controller of the Smart TV has become simplified, e.g., buttons on a remote controller may be minimized, in order to pursue higher convenience in using the Smart TV.

However, the remote controller with such simplified design has limitations in operating various functions of the Smart TV. In other words, a user may have to directly search the functions he/she wants from the Smart TV, and thus the user may spend a large amount of time and may face difficulties while searching the functions having a complicated tree structure.

SUMMARY

One or more exemplary embodiments provide a display apparatus which searches and displays a user handwriting trace and a display method thereof.

According to an aspect of an exemplary embodiment, there is provided a display apparatus including a display, an input unit configured to receive a handwriting trace, in response to a user handwriting being performed at a remote control apparatus; a detector configured to determine text corresponding to the handwriting trace; and a controller configured to search for an item corresponding to the text, classify the item into a plurality of categories, and control the display to display the item on the display.

The controller may be further configured to, in response to a subsequent handwriting being performed at the remote control apparatus determine a subsequent text from a subsequent handwriting trace according to the subsequent handwriting, search for an item corresponding to the text and the subsequent text, classify the item according to the plurality of categories, and control the display to display the item on the display.

The controller may be further configured to control the display to display a handwriting display area indicating the received handwriting trace on one area of a screen, match each of the plurality of categories in up, down, left, and right directions extending from the handwriting display area, and control the display to arrange and display a search result classified by the plurality of categories.

The controller may be further configured to control the display to display the handwriting display area at one of at least a center of the screen and one of four corners on the screen.

The controller may be further configured to perform a control operation corresponding to the selected item in response to the item being selected.

The plurality of categories may include at least one of an application category, a web category, a function category, and a content category.

According to an aspect of another exemplary embodiment, there is provided a display method including in response to a subsequent handwriting being performed at the remote control apparatus, determining a subsequent text from a subsequent handwriting trace according to the subsequent handwriting; searching for an item corresponding to the text and the subsequent text; and classifying the item corresponding to the text and the subsequent text according to the plurality of categories; and displaying the item corresponding to the text and the subsequent text on the display.

The method may further include in response to a subsequent handwriting being performed at the remote control apparatus, determining a subsequent text from a subsequent handwriting trace according to the subsequent handwriting, searching for an item corresponding to the text and the subsequent text, and classifying the item according to the plurality of categories and displaying the item on the display.

The method may further include displaying a handwriting display area indicating the received handwriting trace on an area of a screen, matching each of the plurality of categories in up, down, left, and right directions extending from the handwriting display area, and arranging and displaying a search result classified by the plurality of categories.

The handwriting display area may be displayed one of at least the center of the screen and one of four corners on the screen.

The method may further include in response to the item being selected performing a control operation corresponding to the selected item.

The plurality of categories may include at least one of an application category, a web category, a function category, and a content category.

BRIEF DESCRIPTION OF THE DRAWINGS

The above and/or other aspects will be more apparent by describing certain exemplary embodiments with reference to the accompanying drawings, in which.

DETAILED DESCRIPTION

Figure 1:
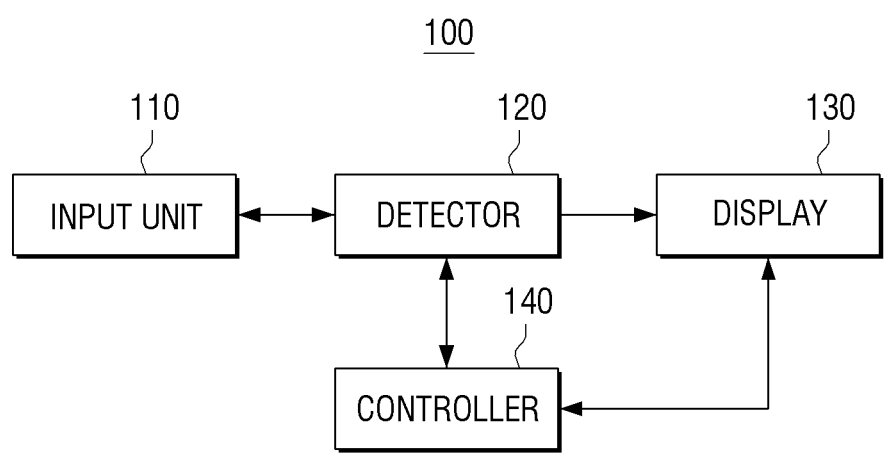
FIG. 1 is a block diagram illustrating a display apparatus according to an exemplary embodiment.

Certain exemplary embodiments are described in higher detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail because they would obscure the application with unnecessary detail.

FIG. 1 is a block diagram illustrating a display apparatus 100 according to an exemplary embodiment.

Referring to FIG. 1, a display apparatus 100 may include an input unit 110, a detector 120, a display 130, and a controller 140 according to an exemplary embodiment.

The input unit 110 receives a control signal from a remote control apparatus. For example, when a user transmits a control signal to the display apparatus 100 by using the remote control apparatus, the input unit 110 may receive the control signal.

The remote control apparatus may include a touch pad. In this exemplary embodiment, a user may input the signal through the touch pad of the remote control apparatus. Specifically, a user may write on the touch pad by using fingers, a stylus pen, or other input means. The remote control apparatus may then transmit a user handwriting input through the touch pad to the display apparatus 100. Moreover, the touch pad may display a touch input area including a character key, a letter key, and a function key.

Further, according to one or more exemplary embodiments, a user may use contact gestures on the touch pad to provide an input signal. For example, a user may input a pinch gesture, a zoom out gesture, or a user may input a special double character that provides a specific functionality. For example, a user may input a chevron shape such as a "<" or a ">" which may be interpreted as a fast forward or rewind function. Further, a user may take two finger at the same time and input a ">>" or "<<" character which may provide faster rewinding, fast forwarding, or category menu navigating functionality. Similarly, a user may even use three fingers and draw a ">>>" character, for example, which may provide fast forwarding that is 3× faster than normal fast forwarding or menu scrolling. Other multi-input characters and gestures may also be implemented in accordance with one or more exemplary embodiments.

In addition, the remote control apparatus may include a button configured to select whether or not to input handwriting according to a user's selection. Therefore, if a user selects the function to input user handwriting, when user handwriting is performed on the touch pad of the remote control apparatus, the touch pad can display user handwriting. In this case, the remote control apparatus may transmit a signal corresponding to user handwriting to the input unit 110 of the display apparatus 100. The input unit 110 may receive a signal corresponding to user handwriting from the remote control apparatus, and transmit the received signal to the detector 120.

The detector 120 may receive a signal corresponding to user handwriting from the input unit 110 and extract a text or command corresponding to a handwriting trace. That is, the detector 120 may extract an input trace of a user handwriting, and text corresponding to the extracted trace.

In this case, the display apparatus 100 may further include a storage which configured to store a plurality of texts. The storage may be connected to the detector 120. Accordingly, the detector 120 may analyze a trace of a user handwriting input from the input unit 110 and retrieve a corresponding text from the storage. The detector 120, which extracts text corresponding to user handwriting, may transmit a text to the controller 140 and the display 130. The detector 120, in order to extract a text, may analyze an input user trace, more specifically, the detector may analyze coordinate data as well as vector mapping and input timing of the coordinate data, and may additional use other known image processing tools to analyze the input handwriting trace.

The detector 120 analyzes coordinate data of the input handwriting trace, detect the characteristics of the input handwriting trace, and extract a text corresponding to the characteristics. The detector 120 can analyze a handwriting trace according to various methods.

For example, the detector 120 classifies a trace from beginning point to ending point of handwriting into a certain unit of distance, and detects a vector line connecting from the beginning point to an ending point of each unit of distance. The detector 120 calculates an angle among vectors of each direction, and determines the characteristics of a handwriting trace based on the calculation result. For example, if angles of the direction vectors corresponding to each unit of distance is within a certain range and thus are similar or same to each other, an entire trace may be considered a straight line.

According to another exemplary embodiment, if there are areas whose angles are different from each other for more than a certain angle, it will be determined that a handwriting trace is bent. When this bent area is more than the preset number, the detector 120 may determine that a handwriting trace is a curved line.

In addition when there are overlapped areas among a handwriting trace, the detector 120 recognizes that there is a looped curve in those areas. The detector 120 may extract information on the characteristics of a handwriting trace of a user, based on whether or not a line is a looped curve, bent angle of a line, the number of bent areas, etc. The detector 120, by comparing information on the characteristics and pre-stored text information, may detect what text a user handwriting trace corresponds to.

The handwriting trace, which is extracted by using the above method, may be displayed by the display 130 connected to the detector 120.

In addition, when another handwriting trace is input within a pre-determined time, the detector 120 determines whether the trace is a straight line or a curved line by analyzing the coordinate data in the way described above. The display 130 can display another handwriting trace input within a pre-determined time, in addition to the handwriting trace being input and displayed.

As described above, the detector 120, by making an inquiry into at least one trace input within a pre-determined time, may extract an entire text. The detector 120 may transmit the text extracted by using the above method to the display 130 and the controller 140. The display 130 may then display the text received from the detector 120. The controller 140 may, for example, search for an item according to the text received from the detector 120.

The controller 140 may receive a text from the detector 120 and search for or within an item corresponding to the received text. The item may include information with a variety of criteria such as a broadcasting channel, a content genre, a content title, an application, a function, and/or a website.

The item may be stored in the storage or be received from an external transmitting apparatus or an external server. Accordingly, the controller 140 may search and receive an item corresponding to a text from the storage, or search and receive from an external transmitting apparatus and/or an external server. If, there is no searched item, the controller 140 can display a message indicating that there is no searched item. In addition, when there are a plurality of the searched items, the controller 140 may classify the searched plurality of items into a plurality of categories and display the items. With respect to this, further explanation will be given in FIGS. 9-12.

The controller 140 may extract, as described above, the subsequent text from the handwriting trace according to the subsequent handwriting when a subsequent handwriting is performed by the remote control apparatus. In this case, the controller 140 may control to re-search an item corresponding to the combination of the previously extracted text and the subsequently extracted text. The process of re-searching an item corresponding to the combination of the previously extracted text and the subsequently extracted text may be the same as the description above. In this case, the controller 140 can control to classify the re-searched item into a plurality of categories and display the item.

The controller 140 may control to locate a handwriting display area indicating the received handwriting trace is at one area of a screen. In addition, the controller 140 may control to match each of the plurality of categories in up, down, left, and/or right directions based on the handwriting display area, and align/display the search result classified by the categories. In this case, a plurality of categories may include at least one of an application category, a web category, a function category, and a content category. Moreover, the handwriting display area can be located at a center of a screen. In this case, a search result classified by categories can be aligned and displayed in an up, down, left, and/or right directions from the handwriting display area. Further, the handwriting display area may be located at a corner of a screen. In this exemplary embodiment, the search result classified by the categories can be aligned and displayed in two directions extending from the handwriting display area located at a corner of a screen. For example, when the handwriting display area is located at a left top corner of a screen, the search result can be aligned and displayed in a right direction and/or a down direction based on the handwriting display area. When an item is selected from among the at least one item displayed by such method, the controller 140 can control to perform a control operation corresponding to the selected item.

The display apparatus 100 can search and display an item from various sources. For example, the display apparatus can search an item from not only the storage stored in the display apparatus 100, but also various external apparatuses such as a content display apparatus, a broadcasting station, a web server, a cloud server, and a user terminal apparatus.

Figure 2:
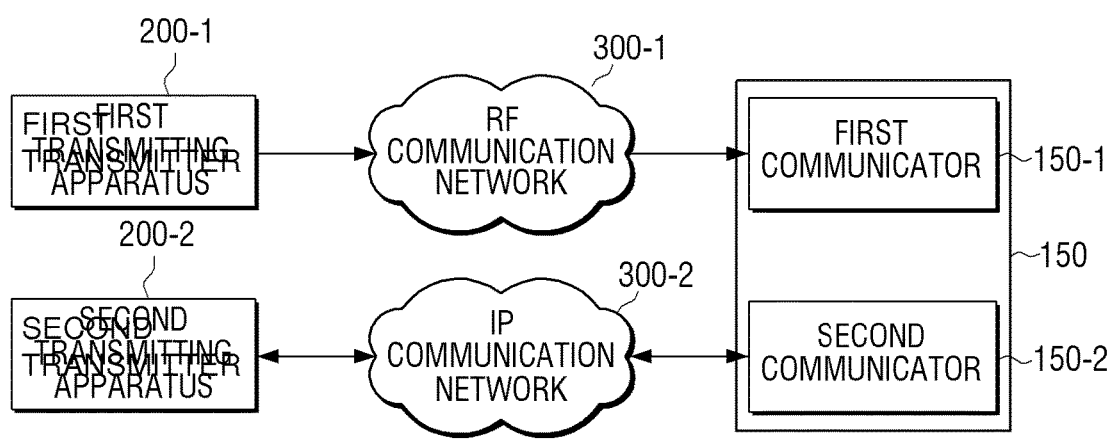
FIG. 2 is a block diagram illustrating a configuration of a communication system according to an exemplary embodiment.

FIG. 2 is a block diagram illustrating a configuration of a communication system according to an exemplary embodiment which may search items from various external devices. Referring to FIG. 2, a communication system may include a plurality of transmitting apparatuses and a communicator 150.

A plurality of transmitting apparatuses transmits a signal through a communication network different from each other. FIG. 2 illustrates that a first transmitting apparatus 200-1 transmits a signal through a radio frequency (RF) communication network 300-1, and a second transmitting apparatus 200-2 transmits a signal through an internet protocol (IP) communication network 300-2, but the type of a communication network is not limited to the above. For convenience of explanation, a signal transmitted by the first transmitting apparatus 200-1 is called a first signal, and a signal transmitted by the second transmitting apparatus 200-2 is called a second signal.

The first signal and the second signal may respectively include data classified to compose an item. In other words, the first signal may be a data which composes an item received through the RF communication network 300-1, and the second signal may be a data which composes an item received through the IP communication network 300-2. The first signal and the second signal may be received simultaneously or selectively by the controller 140. Moreover, the first signal can be data composed of any one item, and the second signal can be data composed of an item different from the above item. In addition, the first signal may be data composed of a part of one item, and the second signal can be data composed of a rest of the same item. The item can be classified into a video data and an audio data or according to various criteria such as a moving image data and a script data, and be transmitted to the first and the second signals.

A method of transmitting a signal through the RF communication network 300-1 and the configurations thereof can be realized differently according to the broadcasting specification. In other words, digital broadcasting specification includes Advanced Television System Committee (ATSC), Digital Video Broadcasting (DVB), Integrated Services Digital Broadcasting-Terrestrial ISDB-T ( ) etc.

Detailed configurations and operations of the first transmitting apparatus 200-1 which transmits the first signal through the RF communication network 300-1 can be different depending on which broadcasting specification among the above-mentioned specifications is applied. The configurations and the operations of the first communicator 150-1 are the same. For example, when the ATSC specification is applied, the first transmitting apparatus 200-1 can include a randomization unit, an RS encoder, a data interleaver, a trellis encoder, a sink and pilot inserting unit, 8VSB modulator, RF up converter, and an antenna, etc. On the other hand, the first communicator 150-1 may include an antenna, an RF down converter, a demodulator, an equalization unit, a demultiplexer, an RS decoder, a deinterleaver, etc. As the detailed configurations to transceive signals by each broadcasting specification have been disclosed in a standard document of each broadcasting specification, and thus detailed illustration and explanation will be omitted.

The second transmitting apparatus 200-2 transmits the second signal including additional data to the second communicator 150-2 through the IP communication network 300-2. The IP communication network 300-2 may be realized with various types of networks such as a web, a cloud network, and a local network. The second transmitting apparatus 200-2 may transmit the second signal with a streaming method. Specifically, various streaming method such as RTP (Real Time Protocol) and HTTP (Hypertext Transfer Protocol) can be used. According to another exemplary embodiment, the second transmitting apparatus 200-2 can provide additional data with a download method. In the case of the download method, file formats can be various types including AVI, MP4, MPG, MOV, and WMV, etc.

A controller 130 of the display apparatus 100 can be configured in various forms.

Figure 3:
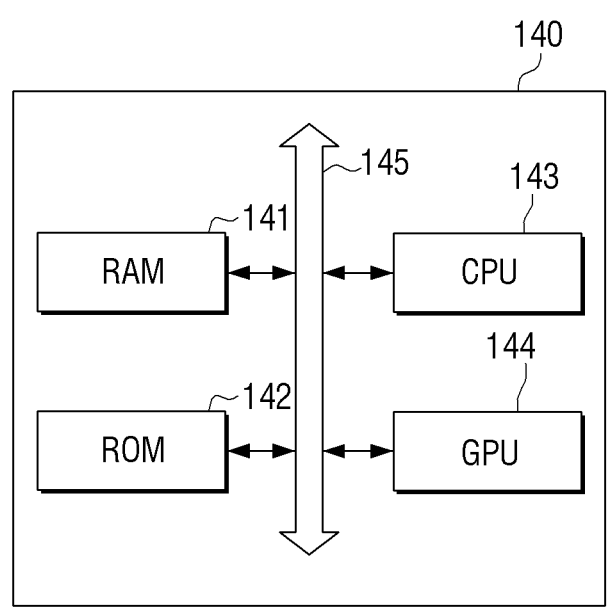
FIG. 3 is a block diagram illustrating a configuration of a display apparatus according to an exemplary embodiment.

FIG. 3 is a block diagram illustrating a configuration of a display apparatus according to an exemplary embodiment.

Referring to FIG. 3, the controller 140 may control overall operations of the display apparatus 100. The controller 140 may include a RAM 141, a ROM 142, a CPU 143, a GPU 144, and a Bus 145. RAM 141, ROM 142, CPU 143, GPU 144, etc. can be interconnected through the Bus 145, etc.

The CPU 143, by accessing the storage and using O/S stored in the storage, may perform a booting process. In addition, the CPU performs various operations by using various programs, content, and data stored in the storage. Moreover, by analyzing handwriting trace, the CPU may extract corresponding text from the storage.

In the ROM 142, a command set and so on for system booting may be stored. When a turn-on command is input and power is supplied, the CPU 143 may copy an operating system (O/S) stored in the storage in accordance with the command stored in ROM 142 to RAM 141, executes O/S, and performs system booting. When booting is completed, CPU 143 copies various programs stored in the storage to RAM 141, executes copied programs in RAM 141, and perform various operations.

The GPU 144 may display an item screen, a content screen, or search result screen, etc., when booting of the display apparatus 100 is completed. Specifically, GPU 144 can generate a screen including various objects such as an icon, an image, and a text by using a calculation unit and a rendering unit. The calculation unit calculates attribute values such as coordinate value where each object is displayed according to layout of a screen, shape, size, and color. The rendering unit, based on the calculated attribute values, generates a screen with various layouts including the object. A screen generated by the rendering division is provided to the display 130 and displayed within a display area. The GPU 144, based on a signal received from the remote control apparatus, may display the handwriting which the user writes on the touch pad of the remote control apparatus as it is inputted on the screen.

As described above, the display 130d displays various screens. The display 130 can be realized as various types of displays such as a Liquid Crystal Display (LCD), an Organic Light Emitting Diode (OLED) display, a Plasma Display Panel (PDP), etc. In the display 130, driving circuit and backlight unit that can be realized as the same type of a-Si thin film transistor (TFT), low temperature poly silicon (LTPS) TFT, organic TFT (OTFT) can be included.

Figure 4:
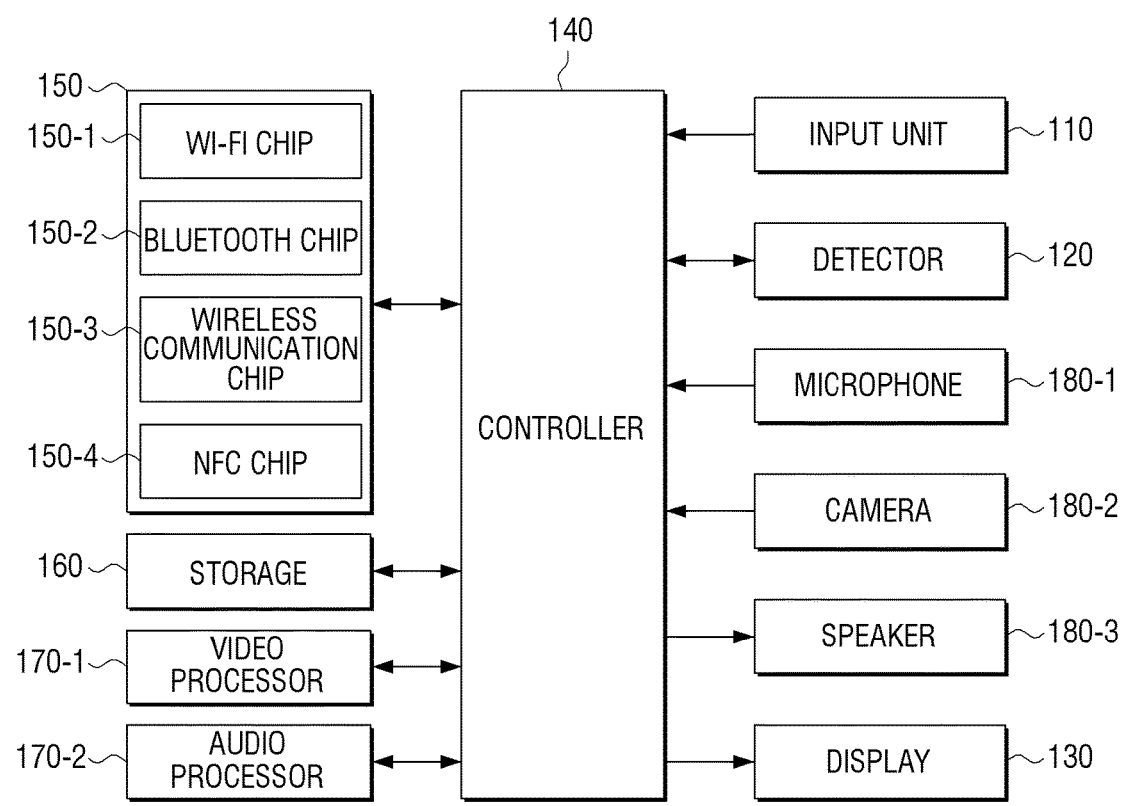
FIG. 4 is a block diagram illustrating a configuration of a display apparatus according to an exemplary embodiment.

FIG. 4 is a block diagram illustrating a configuration of a display apparatus according to an exemplary embodiment.

Referring to FIG. 4, the display apparatus 100 may include the display 130, the controller 140, the communicator 150, the storage 160, a video processor 170-1, an audio processor 170-2, the input unit 110, the detector 120, a microphone 180-1, a camera 180-2, and a speaker 180-3.

The storage 160 may be configured to store various programs and data required for operations of the display apparatus 100.

The display 130 can be embodied as a general LCD display or a touch screen. When embodied as a touch screen, a user can touch the screen and control the operations of the display apparatus 100. In addition, when the display 130 is not embodied as a touch screen, the input unit 110 can receive a signal transmitted from the remote control apparatus and transmit the signal to the controller 140.

The controller 140, by using various program and data stored in the storage 160, may control overall operations of the display apparatus 100. As the display 130 and the controller 140 have been already described in detail, and thus further explanation will be omitted.

The communicator 150 may be configured to perform communication with various types of external devices according to various types of communication methods. The communicator 150 can include a Wi-Fi chip 150-1, a Bluetooth chip 150-2, a wireless communication chip 150-3, and a near field communication (NFC) chip 150-4.

The Wi-Fi chip 150-1 and the Bluetooth chip 150-2 perform communication by Wi-Fi method and Bluetooth respectively. In the case of using the Wi-Fi chip 150-1 or the Bluetooth chip 150-2, various connection information such as SSID and session key can be transceived first, and then various kinds of information can be transceived after connecting communication by using the transceived connection information. Wireless communication chip 150-3 performs communication in accordance with various communication specifications such as IEEE, Zigbee, 3rd Generation (3G), 3rd Generation Partnership Project (3GPP), Long Term Evolution (LTE), etc. The NFC chip 150-4 is a chip which is operated by using a NFC method which uses 13.56 MHz band among various RF-ID frequency bands such as 135 kHz, 13.56 MHz, 433 MHz, 860-960 MHz, 2.45 GHz.

In addition, the communicator 150 can perform communication with various external server devices such as a search server.

Based on the signal received through the input unit 110, when the detector 120 extracts a text corresponding to a user handwriting trace, the controller 140 can access various external devices through the communicator 150 and receive an item corresponding to an extracted text.

In addition, the communicator 150 can perform search by directly performing communication with various external devices, not a server device.

The video processor 170-1 may be configured to process video data included in an item received through the communicator 150 or an item stored in the storage 160. That is, various image processing on the video data such as decoding, scaling, noise filtering, frame rate conversion, resolution conversion, etc. can be performed.

The audio processor 170-2 may be configured to process audio data included in an item received through the communicator 150 or an item stored in the storage 160. The audio processor 170-2 can perform various processing on the audio data such as decoding, amplification, noise filtering, etc. can be performed.

The controller 140, when an item corresponding to a multimedia content is selected from among the items displayed on the display 140, receives the corresponding multimedia content through the communicator 150.

The controller 140, when multimedia content is received, can control the video processor 170-1 및 the audio processor 170-2 to extract video data and audio data respectively by demultiplexing the multimedia content and decode video data and audio data to replay a corresponding item.

The display 130 can display an image frame generated by the video processor 170-1.

The speaker 180-3 outputs audio data generated by the audio processor 170-2.

The input unit 110 may receive a manipulation signal transmitted by the external remote control apparatus and transmit the signal to the controller 140. In this case, the input unit 110 can be formed at an arbitrary area of a main body of the display apparatus 100 such as a front portion, a side portion, a back portion and so on.

The microphone 180-1 may be configured to receive a user's voice or other sounds and convert them to audio data. The controller 140 can use user's voice input through the microphone 180-1 for searching or extracting an item, or can change them to audio data and store in the storage 160.

The camera 180-2 may be configured to photograph a standstill image or a moving image according to a user's control. The camera 180-2 can be embodied to a plurality of units such as a front camera and a back camera.

When the camera 180-2 and the microphone 180-1 are prepared, the controller 140 can perform control operations according to a user motion recognized by the user's voice input thorough the microphone 180-1 or the camera 180-2. The display apparatus 100 may be operated as a motion control mode or a voice control mode. When it is operated as a motion control mode, the controller 140 photographs a user by activating the camera 180-2, and perform a corresponding control operation by tracing a change in a user's motion. When it is operated as a voice control mode, the controller 140 can be operated as a voice recognition mode which analyzes a user's voice input through the microphone 180-1, and perform control operation according to the analyzed user's voice. Therefore, the camera 180-2 and the microphone 180-1 can be used for the controller 140 to recognize a user's motion or voice, and extract an item.

In the display apparatus which may support a motion control mode or a voice control mode, voice recognition technology or motion recognition technology can be used in various exemplary embodiments. For example, when a user takes a motion similar to selecting an object such as an item displayed on a screen, or sounds a voice command corresponding to the object, it can be determined that the corresponding object is selected, and the control operation matched with the object is performed.

In addition, though not illustrated in FIG. 4, various external input ports to connect to various external terminals such as a USB port connectable with a USB connector, headset, mouse, LAN, or DMB chip which receives and processes DMB (Digital Multimedia Broadcasting) signal can be further included according to exemplary embodiments in the display apparatus 100.

As described above, the display apparatus 100 can be embodied as various types.

Figure 5:
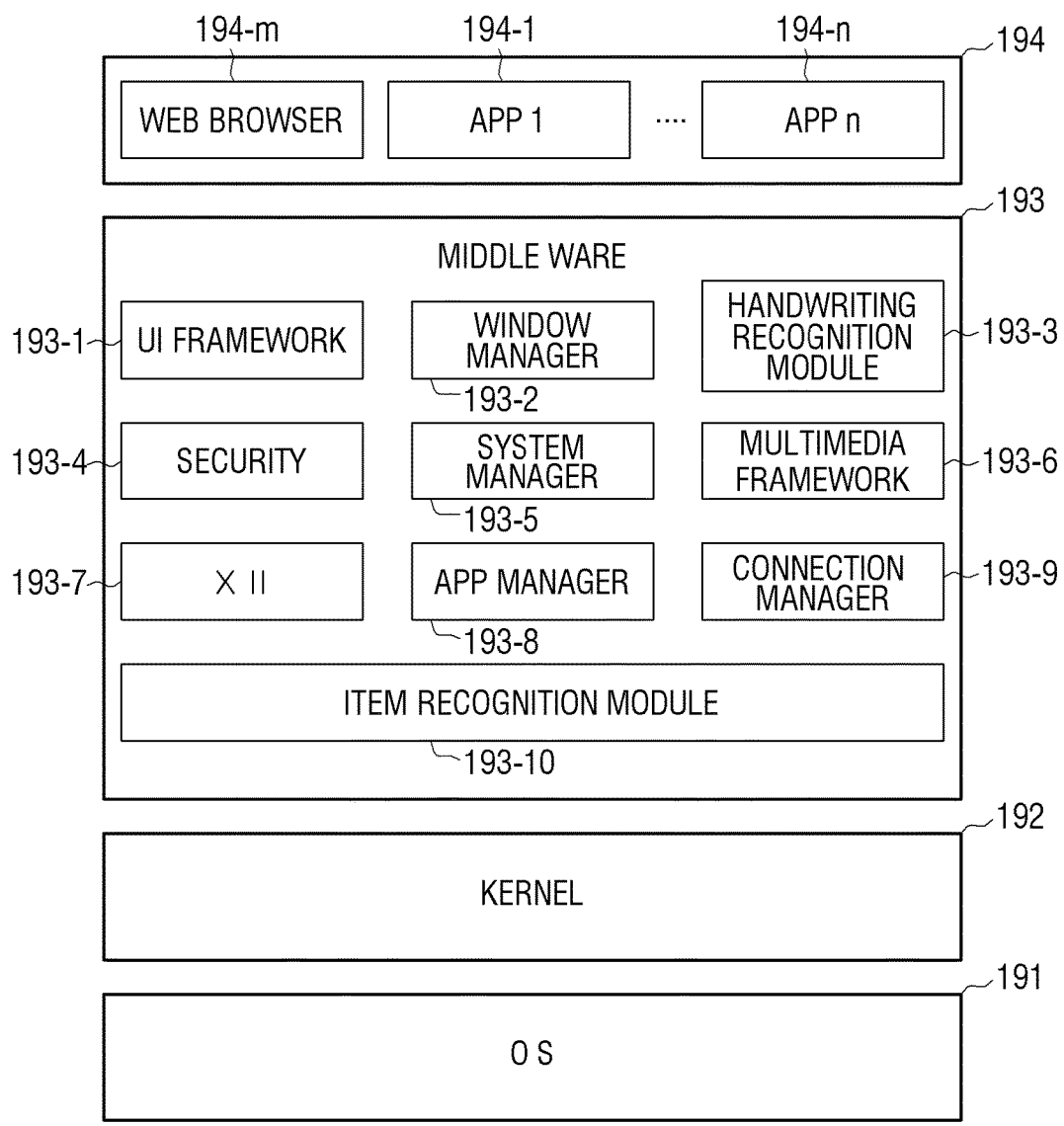
FIG. 5 illustrates a software structure which a display apparatus uses according to an exemplary embodiment.

FIG. 5 illustrates a software structure which a display apparatus 100 uses according to an exemplary embodiment.

Software in FIG. 5 can be stored in the storage 160 but is not limited to this. The software can be stored in various storing means used in the display apparatus 100. According to FIG. 5, software including OS 191, kernel 192, middleware 193, and application can be stored in the display apparatus 100.

Operating System 191 performs a function to control and manage overall operations of hardware. That is, OS 191 is a layer which is in charge of basic functions such as management of hardware, memory, and security.

The kernel 192 plays a role as a passage to deliver various signals sensed by sensing means within the display apparatus 100 to the middleware 193.

The middleware 193 includes various software modules which control operations of the display apparatus 100. According to FIG. 5, the middleware 193 includes a UI framework 193-1, a window manager 193-2, a handwriting recognition module 193-3, a security module 193-4, a system manager 193-5, a multimedia framework 193-6, an X11 module 193-7, an APP manager 193-8, and a connection manager 193-9.

The UI framework 193-1 is a module to provide various UIs. The UI framework 193-1 may include an image compositor module composing various objects such as a text and an item, a coordinate compositor module calculating a coordinate to display an object, a rendering module rendering the composed object to a calculated coordinate, and a 2D/3D UI tool kit providing a tool to compose a UI in 2D or 3D format.

The window manager 193-2 can sense a touch event using a user's body or a pen, a voice recognition event using a user's voice, an operation recognition event by using a user's operation, or other input events. The window manager 193-2, when such event is sensed, can deliver the event signal to the UI framework 193-1 to perform the corresponding operations.

The handwriting recognition module 193-3 is a module configured to parse a user's drawing trace on the touch pad of the remote control apparatus and recognize the details. The detector 120, by executing the handwriting recognition module 193-3, can detect a user's handwritten text. The handwriting recognition module 193-3 receives successive coordinate values according to input user handwriting and stores the values as a stroke. In addition, by using such stroke, a stroke array can be created. The handwriting recognition module 193-3, by comparing pre-stored handwriting library and generated array, can recognize a handwriting trace and extract a text corresponding to the handwriting trace.

The security module 193-4 is a module to support certification on hardware, permission on request, and security storage, etc.

The system manager 193-5 monitors state of each element within the display apparatus 100, and provides a monitoring result to other modules. For example, the system manager 193-5 can provide the monitoring result to the UI framework 193-1 and output an alarm message or sound, when events such as remaining battery not being enough, an error occurrence, and an access being interrupted.

The multimedia framework 193-6 is a module configured to replay multimedia content stored in the display apparatus 100 or provided from an external source. The multimedia framework 193-6 can include a player module, a camcorder module, and a sound processing module, etc. Accordingly, the operations such as replaying various multimedia items and generating/replaying a screen and sound can be performed.

The X11 module 193-7 is a module configured to receive various event signals from various hardware in the display apparatus 100. Herein, various events such as an event to sense a user's manipulation, an event where a system alarm occurs, and an event where a certain program is executed or terminated, can be set.

The APP manager 193-8 is a module configured to manage execution state of various applications installed in the storage 160. The APP manager 193-8 calls and executes an application corresponding to the event when an event where an application execution command is input is sensed from the X11 module 193-7. In other words, the APP manager 193-8, if an event where at least one object is selected is sensed, performs an operation to call and execute an application corresponding to the object.

The connection manager 193-9 is a module configured to support wire or wireless network connection. The connection manager 193-9 can include various modules such as DNET module and UPnP.

The item recognition module 193-10 is a module which recognizes an item stored in the storage 160 or an item the communicator 150 receives, and extracts information on the item. To be specific, the item recognition module 193-10 can extract detailed information such as a title of the item, text corresponding to the title of the item, or other detailed information on the item.

In the upper layer of the middleware 193, there is a browser layer realizing various functions of the display apparatus 100 or at least one application layer.

As the software structure illustrated in FIG. 5 is merely an example, and thus is not to be construed as limiting. Therefore, if necessary, exemplary embodiments can be omitted, modified, or added. For example, in the storage 160, various programs such as a messaging module including a sensing module to analyze signals sensed by various sensors, a messenger program, SMS(Short Message Service) & MMS (Multimedia Message Service) program, and an e-mail program, a call info aggregator program module, a VoIP module, and a web browser (194-*m*) module can be additionally prepared.

Figure 6:
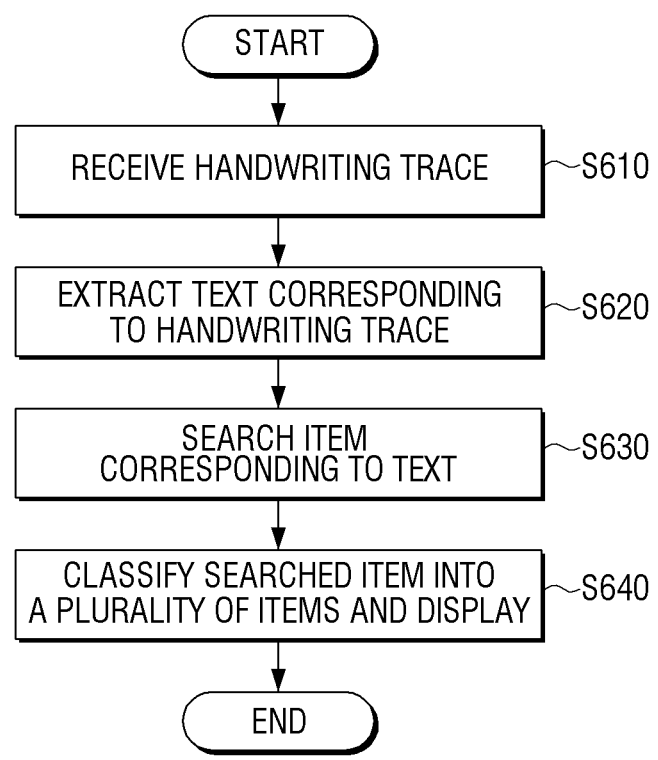
FIG. 6 is a flowchart of a display method according to an exemplary embodiment.

FIG. 6 is a flowchart of a display method according to an exemplary embodiment.

Referring to FIG. 6, the display apparatus 100 receives a user handwriting trace from the remote control apparatus (S610). In this case, the display apparatus 100 can analyze coordinate data of the handwriting trace.

The display apparatus 100 which receives a handwriting trace extracts a text corresponding to the handwriting trace (S620). In this case, the display apparatus 100 analyzes coordinate data of the handwriting trace, and thus can extract a text corresponding to the analyzed coordinate data. That is, by comparing the analyzed coordinate data of the handwriting trace with coordinate data of a pre-stored text trace, the display apparatus can extract a text which mutually corresponds.

Then, the display apparatus 100 searches for an item corresponding to the extracted text (S630). As the item includes each name, subject, title, etc., the display apparatus 100 can search and extract the name, subject, and title of the item corresponding to the extracted text.

Therefore, when there is an item corresponding to the extracted text, the display apparatus 100 may display the item. In particular, if a plurality of items are searched, the display apparatus 100 classifies the plurality of searched items into a plurality of categories and displays them (S640). If there are no searched item, a visual message and/or sound message indicating that there is no search result can be displayed. In addition, if the plurality of searched items correspond to one category, the items can be classified to the corresponding one category, and the plurality of the searched items can be aligned and displayed. A display method described above will be further explained in FIG. 8.

Figure 7:
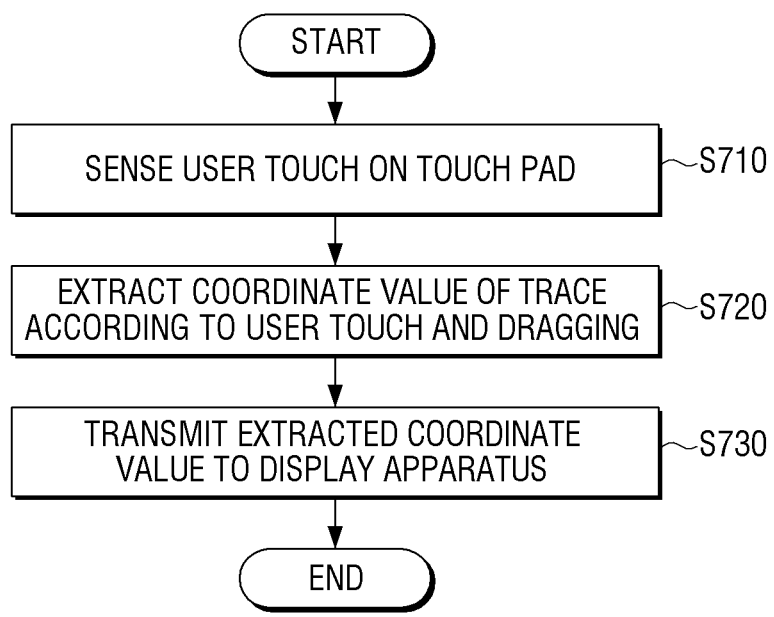
FIG. 7 is a flowchart of a display method according to an exemplary embodiment.

FIG. 7 is a flowchart of a display method according to an exemplary embodiment.

Referring to FIG. 7, a user performs handwriting on the touch pad included in the remote control apparatus, and the remote control apparatus senses the handwriting by the user's touch on the touch pad (S710). In this case, the remote control apparatus can sense the user's touch and dragging.

The remote control apparatus which senses a trace according to the user's touch and dragging can extract a coordinate value of the trace (S720). The remote control apparatus which extracts the coordinate value of the handwriting trace can transmit the value to the display apparatus 100 (S730). The configuration of extracting the coordinate value of the handwriting trace may be done in a similar manner as explain above relating to the detector 120 of the display apparatus 100 as illustrated in FIG. 1, and thus further explanations will be omitted. In this case, the remote control apparatus extracts the coordinate value of the handwriting trace, and thus, the display apparatus 100 which receives the coordinate value of the handwriting trace may not separately extract the coordinate value of the handwriting trace. Therefore, the display apparatus 100 can receive the coordinate value of the handwriting trace from the remote control apparatus, and search/extract the text corresponding to the received coordinate value.

According to another exemplary embodiment, the remote control apparatus, after receiving the user handwriting trace, may not directly extract the coordinate value of the handwriting trace, and transmit the signal according to the user handwriting trace with respect to the display apparatus 100. That is, the remote control apparatus may transmit the signal not including the coordinate value of the handwriting trace to the display apparatus 100, and the display apparatus 100 which receives the signal can extract the coordinate value from the signal of the handwriting trace.

Figure 8:
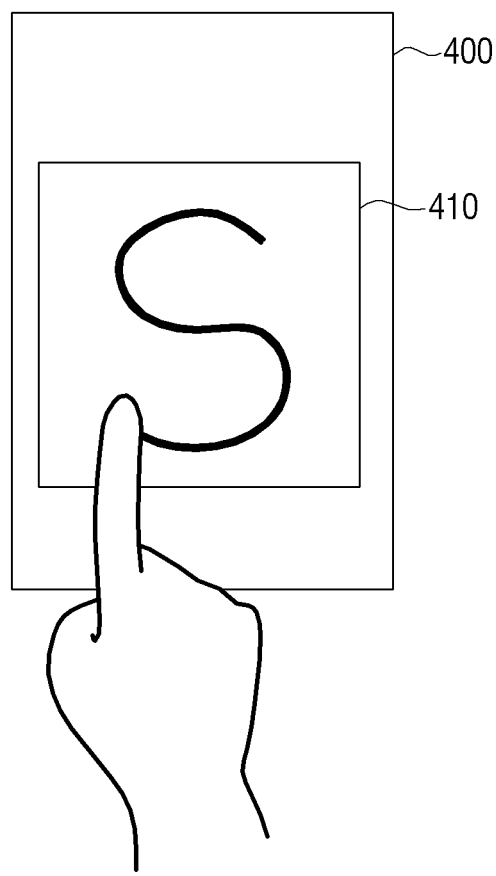
FIG. 8 is an example of a user handwriting according to an exemplary embodiment.
Figure 9:
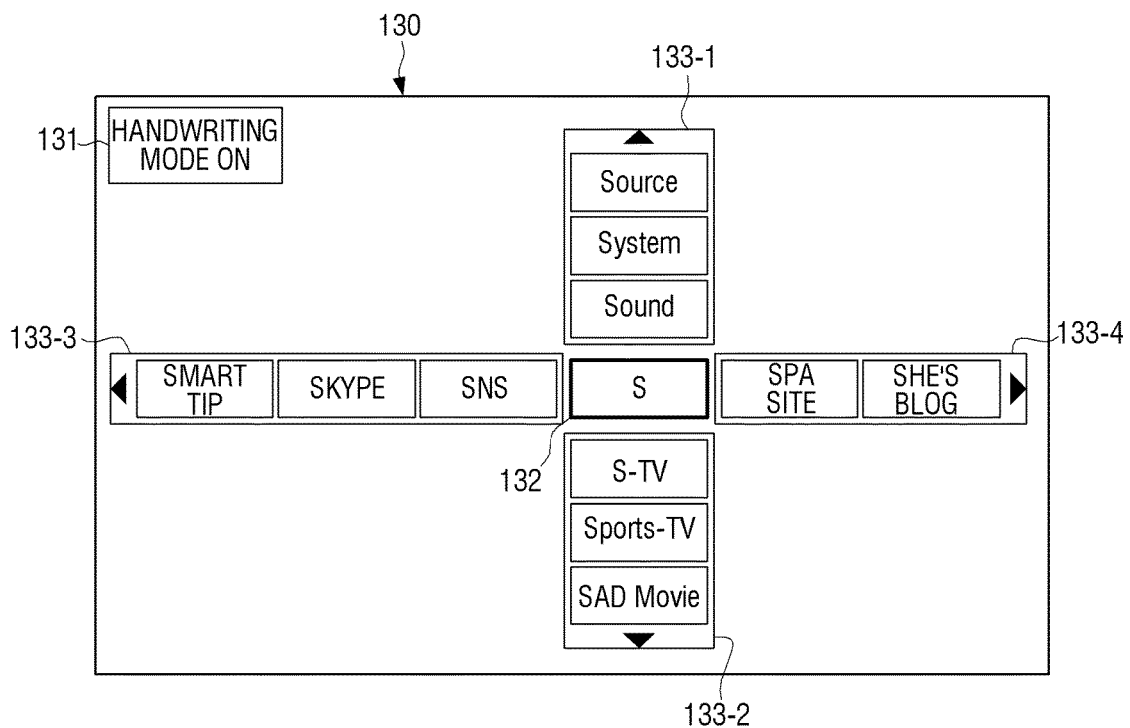
FIG. 9 is a detailed screen of a display apparatus according to an exemplary embodiment.

FIG. 8 is an example of user handwriting according to an exemplary embodiment, and FIG. 9 is an example of a detailed screen of a display apparatus 100 according to an exemplary embodiment.

Referring to FIG. 8, the remote control apparatus 400 is prepared. The remote control apparatus 400 includes the touch pad 410 to input a user touch. According to another exemplary embodiment, the remote control apparatus 400 may further include at least one button to control the display apparatus 100.

A user can control activation and inactivation of a handwriting mode by the remote control apparatus 400. That is, a user, by pressing a handwriting mode button mounted on the remote control apparatus 400, the remote control apparatus 400 and the display apparatus 100 can be set as a handwriting mode. Or, by setting direction of the remote control apparatus 400 to the handwriting mode display area 131 on an area of the display apparatus 100 and touching the touch pad 410, the remote control apparatus 400 and the display apparatus 100 can be set to the handwriting mode. Alternatively, the handwriting mode can be set by a user who touches the touch pad 410 without drawing during the pre-set time or more. Or, the handwriting mode can be set by a user who draws a straight line which is longer than a preset length on the touch pad 410. And then, by manipulating the remote control apparatus 400 once again according to the afore-mentioned method, the handwriting mode can be terminated.

As illustrated in FIG. 9, the handwriting mode display area 131 may be formed on one area of the display apparatus 100, and whether or not the present state is the handwriting mode or not can be displayed on the handwriting mode display area 131. In addition, when the handwriting mode is activated, visual effects such as displaying the text display area 132 of the display apparatus 100 with color contrasted with other areas or increasing brightness than other areas can be added.

While the handwriting mode is set, a user can touch and/or drag on the touch pad 410. In this case, a user can drag by using a touch pen or a part of a user's body. FIG. 8 illustrates that a user draws a trace of a character "S" with the finger. That is, when a user draws a character "S" on the touch pad 410, the touch pad 410 displays the character "S" at the same time with dragging of a user.

The remote control apparatus 400 which senses a trace according to a user touch and dragging can extract a coordinate value of a trace. The remote control apparatus 400 which extracts a coordinate value of the handwriting trace can transmit the value to the display apparatus 100. In this case, the remote control apparatus 400 extracts a value of the handwriting trace, and thus the display apparatus 100 which receives a coordinate value of the handwriting trace may not extract a coordinate value of the handwriting trace separately. Therefore, the display apparatus 100 can receive a coordinate value of the handwriting trace from the remote control apparatus 400, and search/extract a text corresponding to the received coordinate value.

The remote control apparatus 400, after receiving a user handwriting trace, may not extract a coordinate value of the handwriting trace. In this case, the remote control apparatus 400 does not extract a coordinate value of the handwriting trace, and thus the remote control apparatus 400 can transmit a signal according to the user handwriting trace with respect to the display apparatus 100. That is, the remote control apparatus 400 can transmit a signal not including a coordinate value of the handwriting trace to the display apparatus 100, and the display apparatus 100 which receives the signal handwriting trace can extract a coordinate value from the signal.

FIG. 9 illustrates the display apparatus 100 according to input of a remote control apparatus 400 illustrated in FIG. 8. Referring to FIG. 9, the handwriting mode display area 131 displays the handwriting mode, and the text display area 132 displays the handwriting trace received from the remote control apparatus 400. A user, while setting the handwriting mode by the remote control apparatus 400, has written "S" on the touch pad 410. Therefore, the handwriting mode display area 131 of the display apparatus 100 is displayed as "the handwriting mode ON," and the text display area 132 is displayed as "S."

The display apparatus 100 can display an item including "S" on the text display area 132. That is, the text initially displayed on the initialized text display area 132 is "S," and thus an item beginning with "S" among a name, a title, or a subject of an item is searched.

In this exemplary embodiment, the searched item may not limited to a name, a title, or a subject of an item including a displayed text, and the searched item may be an item on a keyword including the displayed text. That is, the display apparatus 100 can display an item on a keyword including a text displayed on the text display area 132. For example, it is assumed that a keyword on "Volume" corresponding to a name of an item performing sound adjusting function is set to "Sound." And then, as illustrated in FIG. 8, a user can draw "S" on the touch pad 410. In this case, though "Volume" corresponding to a name of an item performing sound adjusting function begins with "V," a keyword "sound" can be searched. Therefore, when a user draws "S" on the touch pad 410, an item "volume" including a keyword "sound" can be searched.

When a plurality of items are searched, each item can be classified by the pre-determined categories. Referring to FIG. 9, the searched item can be classified to 4 categories, and the classified item can be displayed on the first category area 133-1, the second category area 133-2, the third category area 133-3, and the fourth category area 133-4. Moreover, a plurality of category areas can be displayed symmetrically, centering on the text display area 132.

FIG. 9 illustrates a function category which sets the display apparatus 100 as the first category, a content category such as movie, soap opera, documentary, and news as the second category, an application category executed on the display apparatus 100 as the third category, and a web category executed on the display apparatus 100 as the fourth category, but the exemplary embodiment is not limited to this. In addition, FIG. 9 illustrates that the first category area 133-1 to the fourth category area 133-4 are displayed in a up, low, left, and right directions centering on the text display area 132, but the exemplary embodiment is not limited to this.

An item can be stored in the display apparatus 100 or can be received from a sending/receiving apparatus from/to server.

In addition, a direction of alignment of an item, category classification criteria, location, size, and type of the handwriting mode display area can be modified diversely according to an exemplary embodiment.

Figure 10:
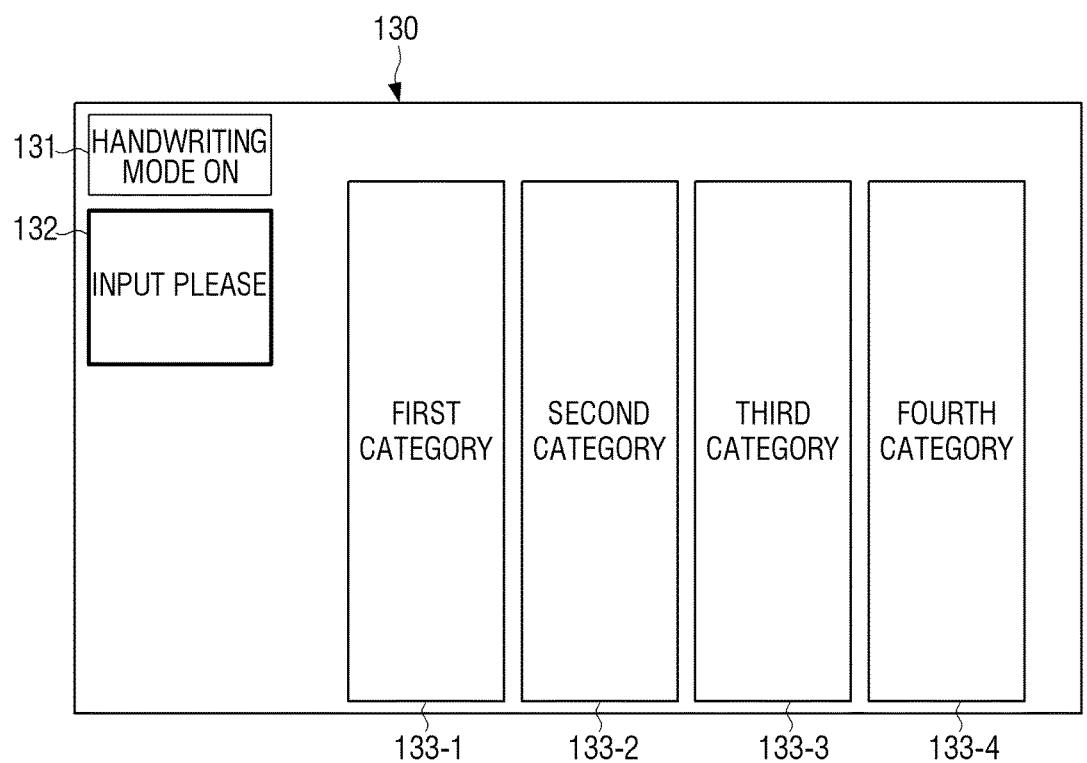
FIG. 10 is a detailed screen of a display apparatus according to another exemplary embodiment.
Figure 11:
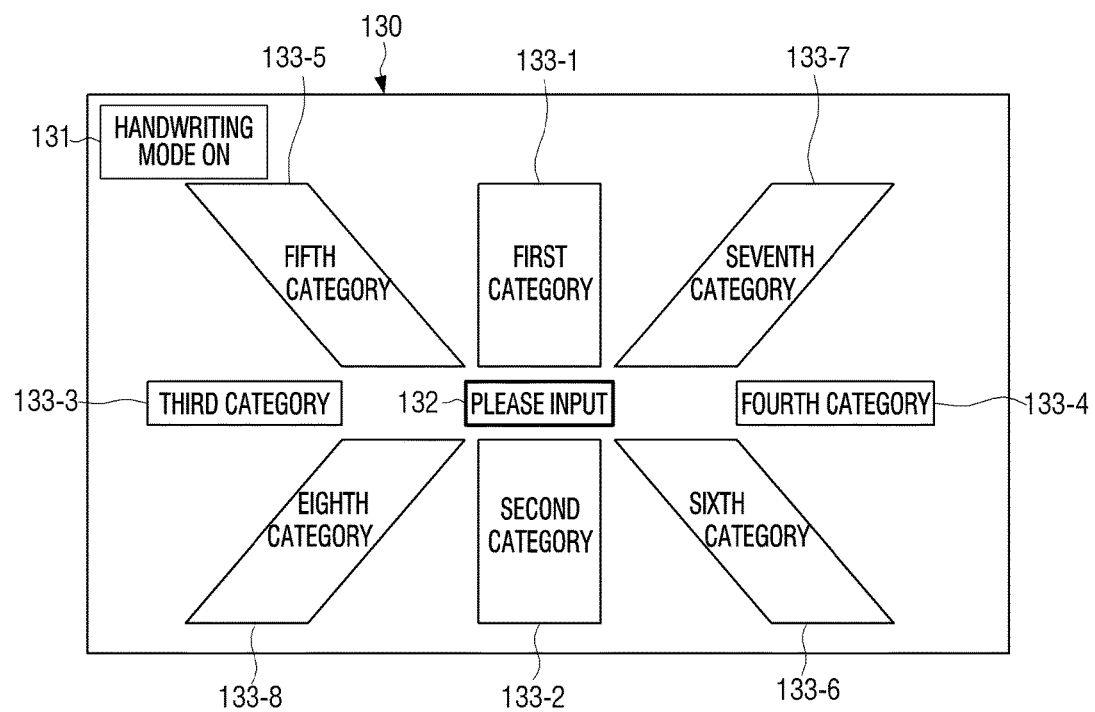
FIG. 11 is a detailed screen of a display apparatus according to still another exemplary embodiment.

FIGS. 10 and 11 illustrate examples of a search result screen according to various exemplary embodiments.

Referring to FIG. 10, the handwriting mode display area 131 and the text display area 132 can be displayed on a left side, and the first category 133-1 to the fourth category area (133-4). In this case, and item included in each category area can be aligned and displayed in up and down directions.

FIG. 11 illustrates a category area which is further segregated. Referring to FIG. 11, centering on the text display area 132, the first category area 133-1 to the eighth category area 133-8 can be aligned in a side direction. In this case, an item included in each category area can be arranged and displayed in a direction where the corresponding category area is aligned.

A user can input a plurality of texts sequentially. For example, after writing one text, a user can write the next text sequentially. In this case, the controller 140 can sequentially extract text based on the subsequent handwriting content and search an item by combining extracted texts.

Figure 12:
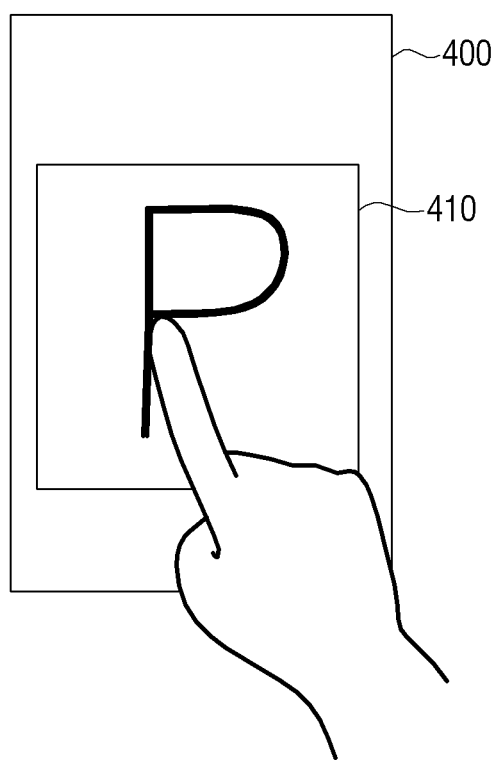
FIG. 12 is another example of a user handwriting according to an exemplary embodiment.
Figure 13:
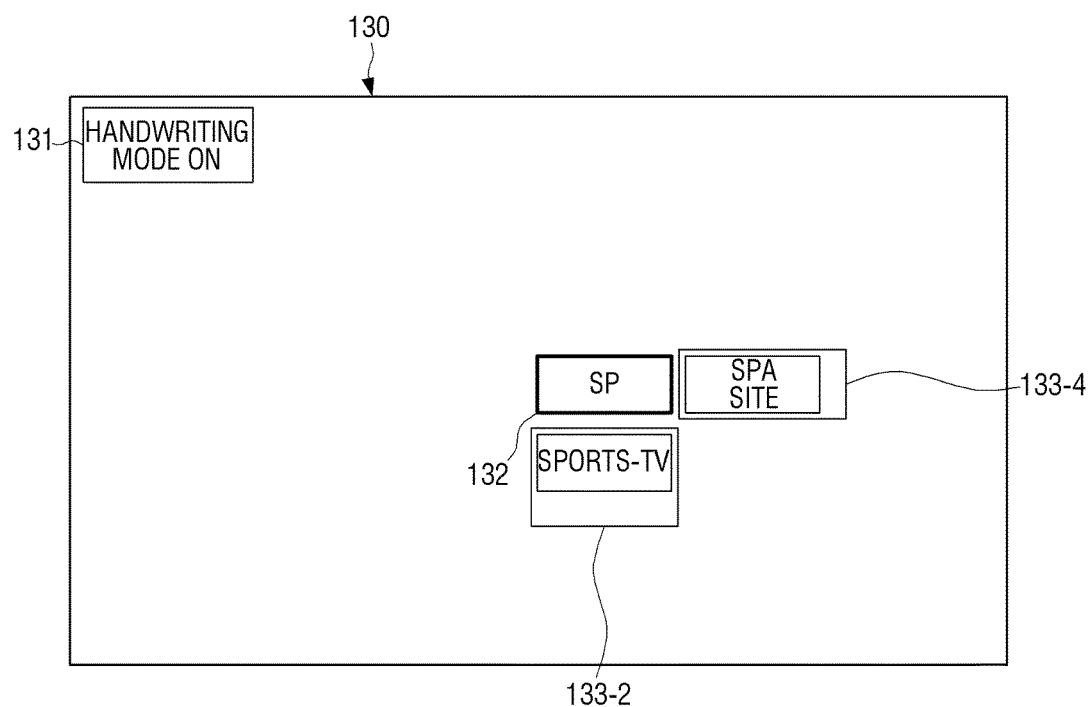
FIG. 13 is a detailed screen of a display apparatus according to another exemplary embodiment.

FIG. 12 illustrates a case where subsequent handwriting of a handwriting trace of FIG. 8 is performed, and FIG. 13 illustrates a detailed screen of the display apparatus 100 according to the subsequent handwriting.

Referring to FIG. 12, a user draws a trace of a letter "P" as a subsequent handwriting of "S." In this case, the remote control apparatus 400 makes "S," which is written previously, disappeared from the touch pad 410, and displays a trace of "P" written subsequently. That is, when a user draws "P" on the touch pad 410, the touch pad 410 displays a trace of "P" at the same time of dragging by a user. The remote control apparatus 400 transmits a trace of "P" displayed on the touch pad 410 to the display apparatus 100.

Referring to FIG. 13, the text display area 132 displays a trace of "P" received from the remote control apparatus 400. In this case, "P" transmitted by the remote control apparatus 400 is a subsequent handwriting of "S" previously transmitted, and thus on the text display area 132, subsequent text "P" is displayed while the previous text "S" is displayed. In other words, "SP" is displayed on the text display area 132.

The display apparatus 100 can display an item including "SP" displayed on the text display area 132. That is, in the same state as illustrated in FIG. 9, an item beginning with "SP" is searched from among a name, title, or subject of an item. Accordingly, an item a user wants to search can be searched more rapidly and intuitively.

A user can select at least one item on a screen where a search result is displayed. A user's selection can be done in various ways.

Figure 14:
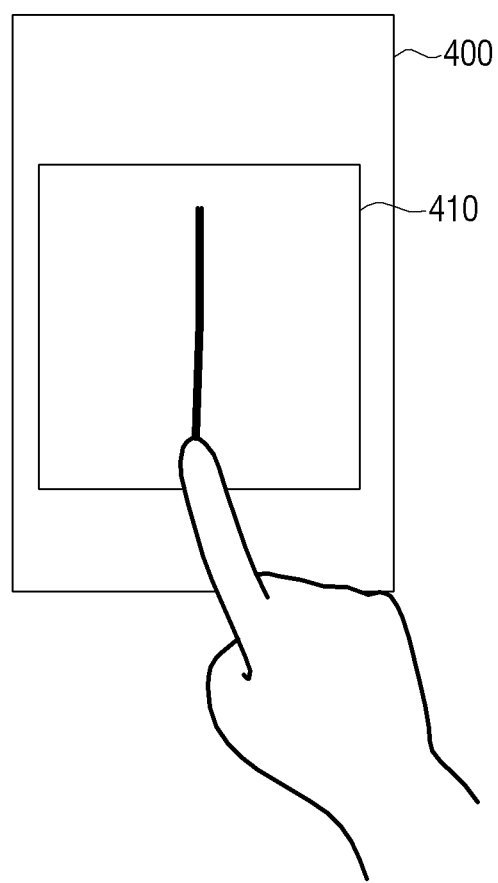
FIG. 14 is an example of a user's input according to an exemplary embodiment.
Figure 15:
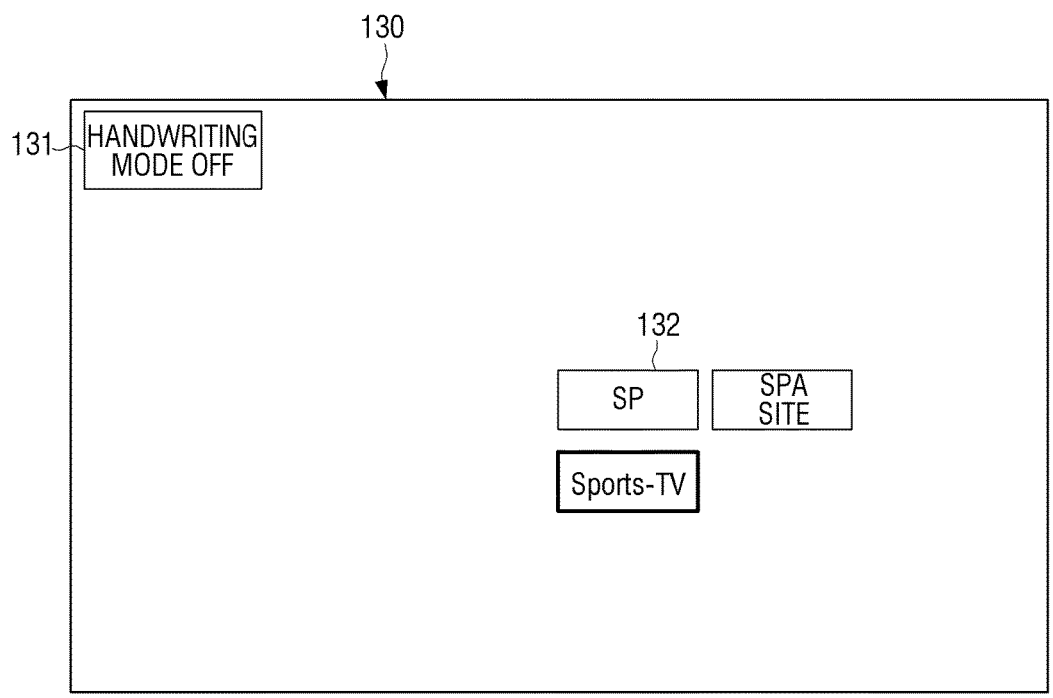
FIG. 15 is a detailed screen of a display apparatus according to still another exemplary embodiment.

FIG. 14 is a drawing illustrating an example of a method of selecting an item, and FIG. 15 is an example of a detailed screen of the display apparatus 100.

According to FIG. 14, a user, after terminating the handwriting mode, can perform touch of a preset pattern and select an item by using the touch pad. That is, in the main body of the remote control apparatus 400, there may be a toggle switch which can toggle selection and termination of the handwriting mode, or a toggle menu which can toggle selection and termination of the handwriting mode can be displayed on the touch pad. A user, by selecting such toggle switch or a menu, can terminate the handwriting mode.

FIG. 14 illustrates drawing of a certain pattern (for example, "I"), after terminating the handwriting mode. In this case, the controller 140 can terminate the handwriting mode. When the handwriting mode is terminated, as illustrated in FIG. 8, visual effect of the text display area 132 may disappear. The controller 140, after terminating the handwriting mode, selects an item according to a certain pattern drawn by a user.

In addition, selecting an item can also be performed by using a direction key in the remote control apparatus 400. The remote control apparatus 400 may include direction keys in up, down, left, and right directions. Accordingly, a user, by selecting any one of the four direction keys in the remote control apparatus 400, can relocate a cursor from the area where the current cursor is located to the area a user wants. According to FIG. 13, a cursor is currently located in the text display area 132. In this state, a user can terminate the handwriting mode according to the above-described method, and press a direction key in down direction among four direction keys in the remote control apparatus 400. Accordingly, a cursor can be relocated from the text display area 132 to an item area named "SPORTS-TV," as shown in FIG. 15.

In addition, selecting an item can be performed by a user's voice recognition or a user's motion recognition. Selecting an item by voice recognition or motion recognition can be applied not only to the case when the handwriting mode is set, but also to the case when the handwriting mode is terminated. Therefore, a user can select an item the user wants among at least one displayed item by voice or motion. Referring to FIG. 13, a cursor is currently located in the text display area 132. In this state, a user, by pronouncing "SPORTS TV," a voice corresponding to an item to select, can select an item. Or, by taking a motion to locate hands in a down direction, a cursor can be relocated from the text display area 132 to an "SPORTS-TV" item area.

Referring to FIG. 15, the controller 140 displays a GUI 131 indicating that the handwriting mode is terminated, and displays a cursor on an item displayed in a direction corresponding to a drawn pattern by a user among searched items. As shown in FIG. 14, when a user draws from an up direction to down direction, the controller 140, based on the text display area 132, displays a determined visual effect that is a cursor, to "SPORTS-TV" which is a down item.

In this state, when a user touches on the touch pad 410, the remote control apparatus 400 transmits a selection signal. The controller 140, while the visual effect is displayed on an item named "SPORTS-TV," when a selection signal is received, determines that the corresponding item is selected. Accordingly, the controller performs control operation corresponding to the corresponding item. For example, if "SPORTS-TV" is selected, the controller 140 can tune a broadcasting channel named "SPORTS-TV" and outputs a signal received through the broadcasting channel. In addition, various applications can be displayed in an item. The controller 140, when it is determined that such application is selected, can execute the application and display the execution screen. As such, the controller 140 can selectively display various items according to a user's handwriting content and perform control operations corresponding to the item selected by a user.

The controller 140, when there is a sub item belonging to an item selected by a user, can display the sub item. A user can select one of the sub items, and the controller 140 can select control operations corresponding to the selected sub item. Selection of the sub item can be done through above-mentioned handwriting recognition method and also through cursor relocation method.

When handwriting recognition method is used, the controller 140 can activate the handwriting mode again while displaying the sub item.

Figure 16:
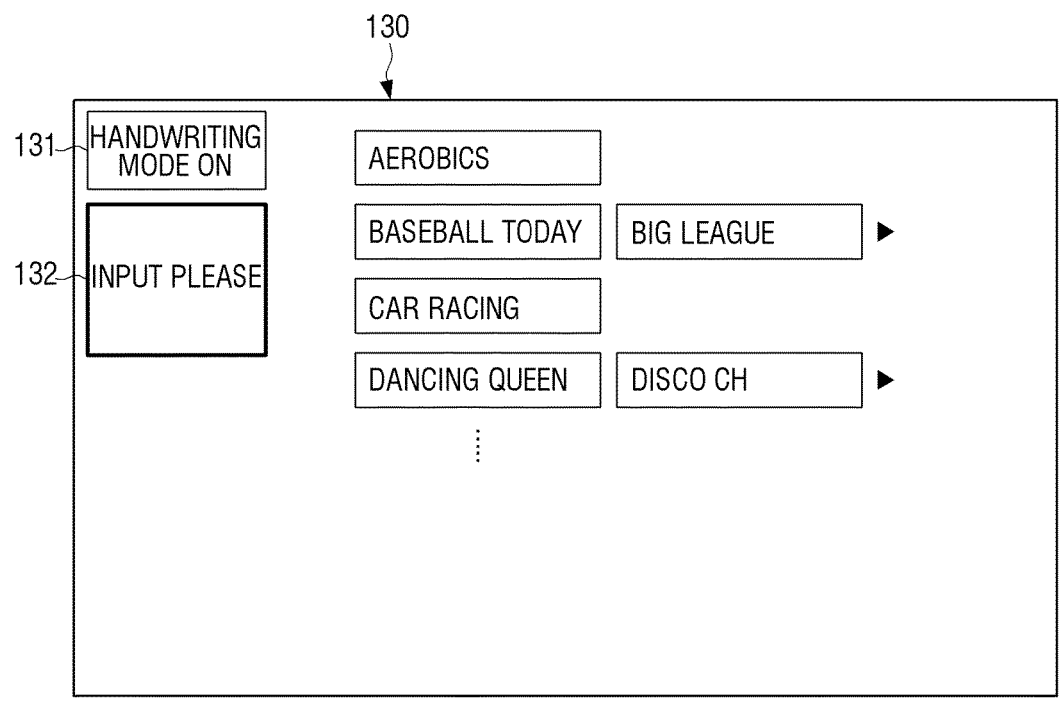
FIGS. 16 and 17 are other detailed screens of a display apparatus according to one or more exemplary embodiments.

FIG. 16 is a drawing illustrating an example of a method of selecting a sub item by activating a handwriting mode.

In other words, when a user selects an item "SPORTS-TV" as in FIG. 15, the controller 140 can align a plurality sub items in a predetermined order.

FIG. 16 illustrates aligning and displaying a plurality of sub items included in "SPORTS-TV" in an alphabetical order of a name, a title, and a subject.

The controller 140 automatically reactivates the handwriting mode, and as illustrated in FIG. 16, displays the text display area 132. A user, as described before, inputs handwriting, and the display apparatus 100 can search and extract sub items corresponding to the input handwriting.

According to another exemplary embodiment, the controller 140 can display a sub item while maintaining the handwriting mode as inactivated.

Figure 17:
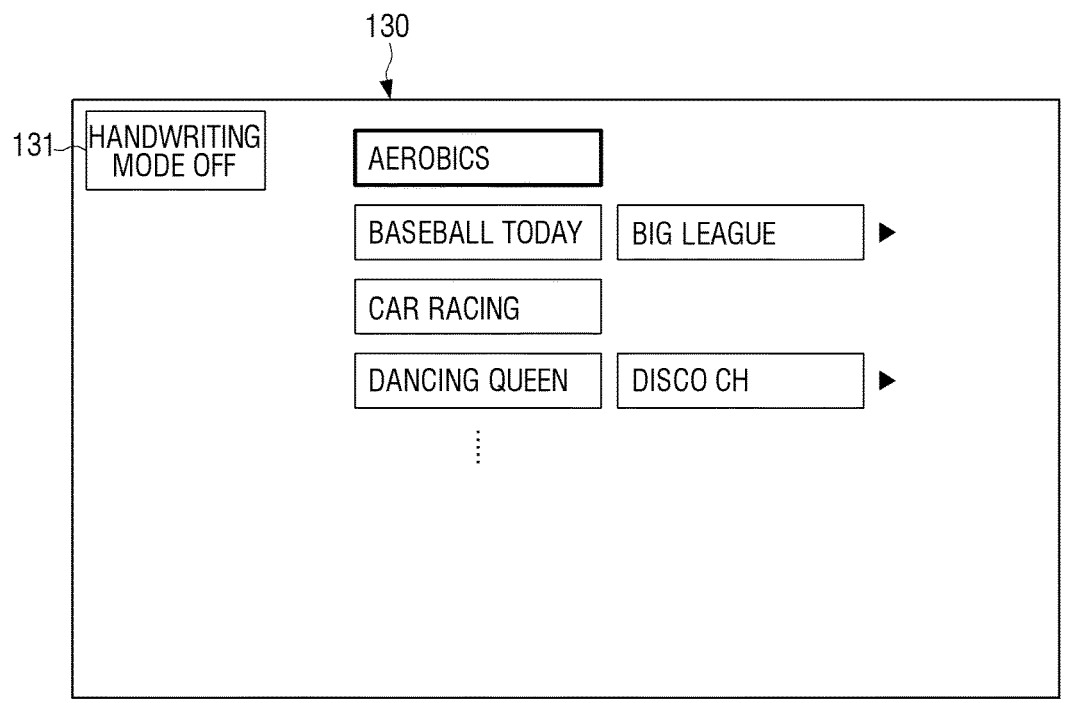

That is, as illustrated in FIG. 17, the controller 140 can display a cursor at a sub item among sub items, without displaying the text display area 132. A user, as described above, can select and execute a sub item by touching and dragging in up, down, left, right, and diagonal directions on the touch pad 410.

As shown above, a user, by inputting handwriting on the remote control apparatus, can conveniently control operations of the display apparatus.

A displaying method of a display apparatus according to the afore-mentioned various exemplary embodiments can also be stored in a non-transitory readable medium. The non-transitory readable medium can be mounted on various devices and used.

For example, when a user handwriting is performed on the remote control apparatus, a program code to perform a display method including receiving a handwriting trace, extracting a text corresponding to the handwriting trace, searching an item corresponding to the text, classifying a pre-searched item into a plurality of categories, and displaying the item can be stored in a non-transitory readable medium and provided.

A non-transitory computer-readable medium indicates media which semi-permanently stores data and is readable with an apparatus, not a media which stores data for short time such as register, cache, memory, etc. Specifically, the above-described various applications or programs may be stored and provided in a non-transitory computer-readable medium such as CD, DVD, hard disk, Blue-ray disk, USB, memory card, ROM.

The foregoing embodiments and advantages are merely exemplary and are not to be construed as limiting. The present teaching can be readily applied to other types of apparatuses. Also, the description of the exemplary embodiments of the present inventive concept is intended to be illustrative, and not to limit the range of the claims, and many alternatives, modifications, and variations will be apparent to those skilled in the art.

What is claimed is:

1. A display apparatus comprising:
a display;
an input unit configured to receive, as a signal, a handwriting trace that is input by a user by a handwriting on a touch screen of a remote control apparatus located externally and separately with respect to the display apparatus; and
a processor configured to:
perform an analysis to identify, in response to the handwriting trace being received, a character corresponding to the handwriting trace,
search external devices connected to the display apparatus via a network, for items related to the character,
classify the items into respective categories to form a respective item group per each of the respective categories including at least two among an application category, a web category, a function category, and a content category, and
control the display to display the character corresponding to the handwriting trace in a first area of a screen and display respective item groups corresponding to each of the respective categories in second areas of the screen, respectively,
wherein the processor is further configured to control the display to display each of the respective item groups in each of the second areas, respectively, separately from one another and adjacent to the first area.

2. The display apparatus as claimed in claim 1, wherein the processor is further configured to, in response to a subsequent handwriting being performed at the remote control apparatus, to identify a subsequent character from a subsequent handwriting trace according to the subsequent handwriting, to search for the items related to the character and the subsequent character, to classify the items related to the character and the subsequent character according to the respective categories, and to control the display to display the items related to the character and the subsequent character.

3. The display apparatus as claimed in claim 1, wherein the processor is further configured to match each of the respective categories in up, down, left, and right directions extending from the first area of the screen, and to control the display to arrange and display the respective item groups corresponding to each of the respective categories in the second areas of the screen, the second areas extending in the up, down, left, and right directions from the first area.

4. The display apparatus as claimed in claim 1, wherein the processor is further configured to control the display to display the first area at a center region of the screen or at one of four corners on the screen.

5. The display apparatus as claimed in claim 1, wherein the processor is further configured to, in response to one of the items being selected, perform a control operation corresponding to the selected item.

6. A display method comprising:
receiving, by a processor of a display apparatus, a handwriting trace from a remote control apparatus located externally and separately with respect to the display apparatus, the handwriting trace corresponding to a handwriting performed by a user on a touch screen of the remote control apparatus;
performing an analysis, by the processor, to identify a character corresponding to the handwriting trace;
searching, by the processor, external devices for items related to the character, via a network;
classifying, by the processor, the items into respective categories to form a respective item group per each of the respective categories including at least two among an application category, a web category, a function category, and a content category;
displaying the character corresponding to the handwriting trace on a first area of a display screen; and
displaying the items grouped together as the respective item group in each of the respective categories in second areas of the display screen, respectively, each of the respective item groups being displayed in each of the second areas, respectively, separately from one another and adjacent to the first area.

7. The display method as claimed in claim 6, further comprising:
in response to a subsequent handwriting being performed at the remote control apparatus, identifying a subsequent character from a subsequent handwriting trace according to the subsequent handwriting;
searching for the items related to the character and the subsequent character;
classifying the items related to the character and the subsequent character according to the respective categories; and
displaying the items related to the character and the subsequent character.

8. The display method as claimed in claim 6, further comprising:
matching each of the respective categories in up, down, left, and right directions extending from the first area of the display screen; and
arranging and displaying the respective item group, per each of the respective categories, in the second areas of the display screen, the second areas extending in the up, down, left, and right directions from the first area.

9. The display method as claimed in claim 6, wherein the first area of the display screen is displayed at a center region of the display screen or at one of four corners on the display screen.

10. The display method as claimed in claim 6 further comprising:
in response to one of the items being selected, performing a control operation corresponding to the selected item.

11. A display system comprising:
a display configured to display handwriting based contents; and
a remote controller located externally and separately with respect to the display, the remote controller comprising:
a touch screen on which a user performs a user handwriting that corresponds to input data,
a second processor configured to generate a handwriting trace based on the user handwriting, and
a transmitter configured to transmit the handwriting trace, as a signal, to the display, wherein the display comprises a first processor, which is coupled to a receiver configured to receive, as the signal, the handwriting trace, and is configured to control analyzing the handwriting trace, extracting the input data from the handwriting trace, classifying the handwriting based contents into respective categories based on the input data to form a respective item group per each of the respective categories including at least two among an application category, a web category, a function category, and a content category, displaying a character corresponding to the handwriting trace on a first area of a display screen, and displaying the handwriting based contents grouped together as the respective item group in each of the respective categories in second areas of the display screen, respectively, each of the respective item groups being displayed in each of the second areas separately from one another and adjacent to the first area.

12. A method for displaying a user handwriting on a display apparatus, the method comprising:
   receiving, through a touch screen of a remote controller located externally and separately with respect to the display apparatus, a user handwriting corresponding to input data;
   generating, at the remote controller, a handwriting trace based on the user handwriting and transmitting the handwriting trace as a signal;
   receiving, at the display apparatus coupled to a processor, the handwriting trace as the signal;
   performing an analysis, by the processor, to identify the input data from the handwriting trace;
   classifying, by the processor, handwriting based contents based on the input data into respective categories to form a respective item group per each of the respective categories including at least two among an application category, a web category, a function category, and a content category; and
   displaying, at the display apparatus, a character corresponding to the handwriting trace on a first area of a display screen, and the handwriting based contents grouped together as the respective item group in each of the respective categories in second areas of the display screen, respectively, each of the respective item groups being displayed in each of the second areas separately from one another and adjacent to the first area.

13. The display apparatus of claim 1, wherein the processor is configured to identify the character corresponding to the handwriting trace as a first character, to identify first items among the items whose title, name, or subject start with the first character, and to group the identified first items into the respective categories, and
   the display is configured to display each of the respective categories of the grouped first items that start with the first character, on the second areas of the screen, respectively.

14. The display apparatus of claim 13, wherein,
   in response to a subsequent handwriting trace being received from the remote control apparatus, the processor is configured to identify the character corresponding to the subsequent handwriting trace as a second character, and to identify second items among the first items whose title, name, or subject start with the first character followed by the second character, and
   the display is configured to display each of the respective categories having grouped second items that start with the first character followed by the second character, instead of the grouped first items.

15. The display apparatus of claim 1, wherein the processor is configured to search for the items whose title, name, or function start with a same letter which corresponds to the handwriting trace, and to classify the items into the respective categories based on the function performed by each of the items.

* * * * *